Patented Oct. 18, 1927.

1,645,703

UNITED STATES PATENT OFFICE.

WILLIAM H. LAPP, OF CHICAGO, ILLINOIS, ASSIGNOR TO THE CONCENTRATE PRODUCTS COMPANY, A CORPORATION OF ILLINOIS.

SUPPLEMENTAL POULTRY FOOD MATERIAL.

No Drawing. Application filed December 28, 1925. Serial No. 77,998.

The present invention relates to a supplemental food material for poultry and is particularly intended for use in connection with poultry which is penned and awaiting transportation or is being conditioned for market. Under such conditions it has been found that the poultry is particularly subject to nutritional diseases and to improper assimilation of food, and is brought to a physical state in which it is readily subject to infectious diseases.

With supplemental foods as hitherto prepared and used; it has been found that there has been an incomplete and unsatisfactory utilization by the poultry of required minerals, particularly calcium and phosphates; and that their use rapidly brings about intestinal disturbances as well as increased blood pressure. In accordance with this invention, the constituent elements of the food are so selected and combined that these defects are avoided and a greatly improved utilization of the food is secured.

In carrying out the invention the supplemental food is so prepared that the organic constituents and water form a minor proportion of the food, say from 35 to 45%. These constituents are of the usual character and include protein, fats, carbohydrates and fibrous material. The inorganic constituents, amounting to 55 to 65% of the product, are combined as hereinafter pointed out.

Of the inorganic constituents those of major importance are calcium and phosphates. In proportioning these constituents I have found that the ratio of calcium to $P_2O_5$ must be within the range of 6 to 8 calcium to 1 $P_2O_5$ to secure a highly effective utilization of these constituents, and that fluorine must be substantially absent; say not over 0.3%. A substantial variation from these proportions very greatly decreases the effectiveness of utilization, although moderately effective utilization may still be secured if the ratio is within the limits of 5 to 9 calcium to 1 $P_2O_5$. Magnesium must also be avoided, the proportion thereof being preferably maintained below 0.2%.

The phosphates are preferably supplied in the form of an organic phosphate, as bone meal, to insure the substantial absence of fluorine compounds. Fluoride-free inorganic phosphates may likewise be employed. The calcium may be partly or wholly supplied in the form of substantially magnesium-free calcium carbonate. Other inorganic materials, such as salt, sulfur, ferrous sulfate or the like may be supplied as required.

A product in accordance with the present invention may be made by mixing the following constituents in the proportions indicated:

| | Per cent. |
|---|---|
| Calcium carbonate | 50–51 |
| Bone and meat meal | 14 |
| Bone meal | 12 |
| Vegetable charcoal | 5 |
| $FeSO_4$ | 4 |
| Sulphur | 4 |
| Salt (NaCl) | 10 |

In such a product the inorganic constituents form 60 to 62% of the food, and a satisfactory nutritive ratio (available protein to carbohydrates) approximating 1 to 2.3 is maintained in the organic constituents. The ratio of calcium to $P_2O_5$ is about 6 to 1, and magnesium and fluorine are not present in appreciable amounts. The calcium and phosphates may be supplied entirely from inorganic sources, if desired, providing they are substantially magnesium and fluoride-free.

I claim:

1. A supplemental poultry food, comprising organic and inorganic components, said inorganic component containing less than 0.2% magnesium and substantially free from fluorine, the inorganic constituents of which contain calcium and phosphates in the proportion of 5 to 9 parts calcium to one part $P_2O_5$.

2. A supplemental poultry food, comprising organic and inorganic components, said inorganic component containing less than 0.2% magnesium and substantially free from fluorine, the inorganic constituents of which contain calcium and phosphates in the proportion of 6 to 8 parts calcium to one part $P_2O_5$.

WILLIAM H. LAPP.